UNITED STATES PATENT OFFICE.

THOMAS A. JEBB, OF BUFFALO, NEW YORK.

IMPROVEMENT IN THE MANUFACTURE OF ARTIFICIAL STONE.

Specification forming part of Letters Patent No. 124,583, dated March 12, 1872.

SPECIFICATION.

I, THOMAS A. JEBB, of the city of Buffalo, county of Erie and State of New York, have invented certain Improvements in the Manufacture of Artificial Stone, of which the following is a specification:

My invention consists, first, in the combination of sand or gravel, hydraulic lime or cement, and dry pulverized soluble glass, mixed together in a dry state and afterwards moistened and compacted together, for forming artificial stone, possessing superior qualities as to hardness, strength, and durability. Second, in the application to the blocks of artificial stone when the mold is first removed therefrom, of a woolen blanket or equivalent porous fabric or material, which serves to protect the surface of the block, by preventing the washing away of the cement by the water applied to the block in drenching, and also by keeping the surface wet and preventing the premature drying of the same. Third, in the process of subjecting blocks of my improved artificial stone during the setting or hardening process, to the action of steam in a close room or compartment—the heat and moisture of which greatly facilitate the desired transformation of the soluble glass and induration of the cement.

The method of manufacturing or producing my improved artificial stone is as follows: The sand employed may be of any quality, though silicious sands are considered the best. Either fine or coarse sand may be used, or preferably a mixture of both with gravel, as the mixture of different sizes reduces the volume of the interstices, which are required to be filled with the cementing material or matrix as it is called. Sand containing a small quantity of clay may be used without washing, by proportionably increasing the amount of the cement or matrix. For one of the ingredients of the matrix I prefer to use Portland cement, although the various kinds of hydraulic limes and cements may be used either alone or mixed with each other. The quantity of the material forming the matrix should be a little more than the amount of the voids between the grains of sand. I prefer to use the ingredients in about the following proportions—say, eighteen parts, by volume, of sand, seven parts of the lime or cement, and one part of soluble glass. The soluble glass in a dry and finely-pulverized state is thoroughly mixed with the sand and powdered cement, by any of the well-known means or methods. Water is then added to the mixture and the whole again thoroughly triturated or mixed. The amount of water employed should be sufficient to render the mass damp, so as to retain its form when compressed in the hand, and sufficient to enable the mixture to be thoroughly compacted by ramming or tamping. Too much water will prevent the material being thoroughly compacted, while too little water will render the stone deficient in strength.

To form a building-block, the composition prepared as above described, is rammed in successive layers in a mold of the form and dimensions required for the stone, made capable of sustaining the requisite pressure from within, and of being taken apart when desired. For building-blocks I prefer to employ two mixtures of the above composition—one containing only fine sand and the other coarse sand and gravel. I first place in the mold a layer of the composition containing only fine sand, and then with my hands or a trowel form a sort of basin of the material by raising a ledge around the outside in contact with the sides of the mold. In the depressed central portion of this layer I place a layer of the coarser composition, and then ram the two together. A second layer of the two compositions is then added and treated in like manner, and so on until the top is reached, when a layer of the finer composition is applied, rammed down and the top struck off or smoothed, when a block will be formed having the outer portions of fine texture, while the inner is composed of mixed sand and coarse gravel. The coarse sand and gravel mixed with fine sand makes a harder and stronger stone than when fine sand alone is employed. After the mold is filled and the upper surface smoothed off, a top board is put on and clamped in place, when the mold is turned over and the sides and ends removed, leaving the formed block resting on the top (now bottom) board, on which it is removed to the yard or store-room where it is left to harden. To facilitate the setting or induration of the cement, it has been the practice heretofore to drench the blocks with water from day to day so as to keep them wet. This is usually accomplished by means of a hose—the action of the stream of water as it comes in contact with the surface before the cement has set, tending to wash it away, which causes a partial disintegration of the surface. The drying and contraction of the outer exposed surface of the block between the times of drenching and before the cement has set, also tends to produce the same result. To prevent this, I envelope the exposed surface of the block after the sides of the mold have been removed therefrom, with a woolen blanket or other equivalent fabric or material, which protects the surface from the disintegrating effect of the water as it is applied in drenching the block, while it at the same time retains the water and prevents the drying of the surface of the block. I prefer to leave the blocks thus enveloped for several days—say from six to ten days—keeping the blanket wet by drenching the same with water from time to time. By this time the cement will have partially set, when the blankets may be removed and the blocks placed in a closed room or compartment into which steam is injected. The pulverized soluble glass in contact with the lime, being kept wet, gradually dissolves and decomposes—the silica of the soluble glass uniting with the lime, forming an insoluble silicate of lime, which cements, hardens, and solidifies the mass into a flinty stone of great hardness. The steam by keeping the block wet and heating it, serves to greatly facilitate this transformation of the soluble glass, and also the induration of the cement. The blocks may be subjected to the action of the steam for several days—from three to five days—the temperature being allowed to gradually diminish, when the blocks may be removed and left to harden without further attention. The blocks as they are first formed may be immediately removed to the steam-room without the preliminary treatment with the wet blanket, or the wet blanket may be used alone without the steam, although I prefer to use both, as above described.

It is obvious that a much smaller proportion of the soluble glass than that stated may be beneficially employed; but the advantages resulting from its use in such case will be less than when a greater proportion is used. The proportion of the lime may also be varied according to special purposes for which the material is required, the same as in the manufacture of béton or concrete. When required for monolithic structures, my improved composition may be used and applied in the same manner as béton or concrete. By a proper selection of sand and the use of different oxides, stones of various shades of color may be produced as required.

What I claim as my invention is—

1. The combination of sand, hydraulic lime or cement, and dry pulverized soluble glass in the manufacture of artificial stone, substantially as hereinbefore set forth.

2. As a part of the process of manufacturing artificial stone, the application of a blanket or equivalent fabric or material for covering and protecting the blocks after the molds are removed and before the induration of the cement, substantially as hereinbefore set forth.

3. As a part of the process of manufacturing my improved artificial stone, subjecting the compacted blocks to the action of steam in a closed compartment, for facilitating the transformation of the soluble glass and the hardening of the cement, substantially as hereinbefore set forth.

T. A. JEBB.

Witnesses:
JAY HYATT,
JOHN J. BONNER.